United States Patent [19]

Aihara et al.

[11] 3,993,612

[45] Nov. 23, 1976

[54] AQUEOUS COATING COMPOSITION

[75] Inventors: Tetsuo Aihara; Tadashi Watanabe; Yasuharu Nakayama; Yoshio Yamashita; Isao Toyomoto, all of Hiratsuka, Japan

[73] Assignee: Kansai Paint Company, Ltd., Japan

[22] Filed: Mar. 19, 1975

[21] Appl. No.: 559,770

[30] Foreign Application Priority Data

Mar. 28, 1974 Japan.............................. 49-34961

[52] U.S. Cl...................: 260/23.7 A; 260/29.6 RW
[51] Int. Cl.$^2$.......................................... C08L 91/00
[58] Field of Search ............... 260/23.7 A, 29.6 RW

[56] References Cited
UNITED STATES PATENTS

| | | | |
|---|---|---|---|
| 3,366,563 | 1/1968 | Hart.............................. | 260/23.7 A |
| 3,551,370 | 12/1970 | Dalton ........................... | 260/23.7 A |

*Primary Examiner*—Lewis T. Jacobs
*Assistant Examiner*—William E. Parker
*Attorney, Agent, or Firm*—Larson, Taylor and Hinds

[57] ABSTRACT

In an aqueous coating composition comprising a vinyl polymer emulsion prepared by subjecting a vinyl monomer to emulsion polymerization in an aqueous medium in the presence of maleinized polybutadiene used as a dispersion stabilizer, an improvement which is characterized in that at least one copolymer is further incorporated, said copolymer being composed of (A) at least one monomer prepared by reacting one glycidyl ester of acrylic acid and methacrylic acid with at least one fatty acid of drying oil fatty acid and semi-drying oil fatty acid, (B) at least one $\alpha,\beta$-ethylenically unsaturated acid and (C) at least one unsaturated monomer containing substantially no carboxyl group and having a Q value of at least 0.1 as determined by Q-e theory.

13 Claims, No Drawings

AQUEOUS COATING COMPOSITION

This invention relates to aqueous coating compositions, and more particularly to an aqueous coating composition which is curable at ambient temperatures and which contains a vinyl polymer emulsion as a component.

Coating compositions curable at ambient temperatures are of various types and include these of the emulsion type. Coating compositions of the emulsion type have the outstanding advantage of being highly amenable to coating operation and substantially free of hazards attributable to the use of organic solvent, because the dispersion medium of such coating compositions predominantly consists of water. However, coating compositions of the emulsion type have the drawback, inherent to the emulsion, that they are liable to form porous coatings, so that the resulting coating films are inferior to those given by coating compositions of other types in respect of corrosion resistance, salt water resistance, weather resistance and gloss. Further, the resulting coating films from coating compositions of the emulsion type are generally soft and poor in water resistance and alkali resistance.

Among emulsion-type coating compositions, a vinyl polymer emulsion is known which is prepared by subjecting a vinyl monomer to emulsion polymerization in an aqueous medium in the presence of maleinized polybutadiene used as a dispersion stabilizer. The vinyl polymer emulsion prepared with the use of maleinized polybutadiene as a dispersion stabilizer is advantageous in being curable very rapidly at ambient temperatures and giving hard coating films having exceedingly high resistance to water and alkalis. However, the aforementioned drawback inherent to emulsion still remains yet to be overcome.

The object of this invention is to provide a vinyl polymer emulsion which is prepared by subjecting a vinyl monomer to emulsion polymerization in an aqueous medium using a maleinized polybutadiene as a dispersion stabilizer and which is rendered free of the foregoing drawback inherent to the emulsion without sacrificing the advantages described. More specifically stated, it is the object of this invention to provide an aqueous coating composition which is curable very rapidly at ambient temperatures and which is capable of forming coating films outstanding in water resistance, alkali resistance, corrosion resistance, salt water resistance, weather resistance and gloss.

Other objects of this invention will become more apparent from the following description.

The above object of this invention is accomplished by incorporating a copolymer as neutralized with a base into a vinyl polymer emulsion prepared by subjecting a vinyl monomer to emulsion polymerization in an aqueous medium in the presence of maleinized polybutadiene used as a dispersion stabilizer, the copolymer being composed of (A) at least one monomer prepared by reacting at least one glycidyl ester of acrylic acid and methacrylic acid with at least one fatty acid of drying oil fatty acid and semi-drying oil fatty acid (hereinafter referred to as "modified monomer A"), (B) at least one $\alpha,\beta$-ethylenically unsaturated acid (hereinafter referred to as "unsaturated acid B") and (C) at least one unsaturated monomer containing substantially no carboxyl group and having a Q value of at least 0.1 as determined by Q-e theory (hereinafter referred to as "unsaturated monomer C").

The Q-e theory referred to above was advocated by Alfrey and Price for the first time in 1947 as to the velocity of addition reaction of a monomer with a radical, and the Q value is a constant representing the general reactivity of the monomer as an essential factor of the theory. Generally, the greater the Q value, the higher is the radical reactivity of the monomer concerned. The Q-e theory is set forth for example in T. Alfrey, Jr., C. C. Price, Journal Polymer Science 2, 101 (1947) and T. Alfrey, Jr., J. J. Bohrer, H. Mark, Copolymerization (Interscience Publishers, New York, 1952).

Our researches have revealed that the copolymer of the components (A), (B) and (C) having no ester bonds on the main chain has excellent storage stability, water resistance, alkali resistance and weather resistance, and is highly miscible with a vinyl polymer emulsion prepared by subjecting a vinyl monomer to emulsion polymerization in an aqueous medium with the use of maleinized polybutadiene as a dispersion stabilizer and that the copolymer, when incorporated into the emulsion, favorably remedies the inherent drawback of the emulsion that it is liable to form porous coating films which are poor in any of such properties as corrosion resistance, salt water resistance, weather resistance and gloss, without impairing the characteristics of the emulsion that it is rapidly curable at ambient temperatures and gives coating films high resistance to water and alkalis. Our researches have further revealed that conventional water soluble alkyd resin and acrylic resin are poor in compatibility with the vinyl polymer emulsion mentioned above and therefore are of no practical use. This invention has been accomplished based on these novel findings.

The copolymer composed of the foresaid constituents (A), (B) and (C) for use in this invention has not been used in usual aqueous coating compositions. The copolymer and the vinyl polymer emulsion are used in the ratio by weight of the copolymer to the emulsion (calculated as the total amount of solids, namely vinyl polymer and maleinized polybutadiene) ranging from 99.7 : 0.3 to 0.3 : 99.7, preferably from 90 : 10 to 10 : 90. When the ratio of the copolymer to the emulsion is outside this range, it is impossible to attain the present objects.

The copolymer to be used in this invention is composed of the three constituents of (A), (B) and (C).

The modified monomer A, a component of the copolymer resin to be used in this invention, is a monomer prepared by reacting a glycidyl ester of acrylic acid or methacrylic acid with drying oil fatty acid and/or semi-drying oil fatty acid. It is a reaction product of 1 mole of fatty acid and 0.8 to 1.2 moles of glycidyl ester of acrylic acid or methacrylic acid. Useful for the preparation of the modified monomer A are various drying oil fatty acids and semi-drying oil fatty acids having about 4 to 26 carbon atoms. At least one of such fatty acids is used. Examples of these fatty acids are safflower oil fatty acid, linseed oil fatty acid, soybean oil fatty acid, sesame oil fatty acid, poppyseed oil fatty acid, perilla oil fatty acid, hempseed oil fatty acid, grape-kernel oil fatty acid, corn oil fatty acid, tall oil fatty acid, sunflower oil fatty acid, cotton seed oil fatty acid, walnut oil fatty acid, rubberseed oil fatty acid, sugar cane oil fatty acid, etc., among which safflower oil fatty acid, linseed oil fatty acid, soybean oil fatty acid, perilla oil fatty acid, tall oil fatty acid, sunflower oil fatty acid and hempseed oil fatty acid are especially preferable. Also, unsaturated fatty acids having conjugated double bonds are usable as a part of drying oil fatty acid and semi-drying oil fatty acid. Examples of such conjugated fatty acid are tung oil fatty acid, oiticica oil fatty acid, dehydrated castor oil fatty acid and Hidiene fatty acid. (trade mark of conjugated fatty acid, produced by Soken Kagaku Co., Ltd., Japan.) The amount of the conjugated fatty acid is in the range of less than 30 wt.% based on total fatty acid.

Usable as glycidyl ester, the other component of the modified monomer A, are glycidyl acrylate and glycidyl methacrylate.

The modified monomer A is prepared usually by reacting the above two components at a temperature of 60° to 220° C, preferably 120° to 170° C, for about 0.5 to 40 hours, preferably 3 to 10 hours in the absence or presence of a reaction catalyst such as tetraethyl ammonium bromide, although these conditions vary with the kind of the fatty acid used. In order to render the modified monomer A more preservable, it is possible to add thereto a polymerization inhibitor such as hydroquinone, p-benzoquinone, etc.

A wide variety of acids having $\alpha, \beta$-ethylenically unsaturated double bond are useful as the unsaturated acid B, another constituent of the copolymer to be used in this invention. Generally usable are acrylic acid, methacrylic acid, crotonic acid, maleic acid, maleic anhydride, fumaric acid and half esterified product of maleic acid having the following general formula:

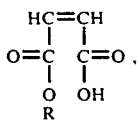

wherein R is alkyl having 1 to 4 carbon atoms, among which acrylic acid, methacrylic acid, crotonic acid, maleic acid, maleic anhydride and fumaric acid are preferable.

Usable as the unsaturated monomer C, another constituent of the copolymer to be used in this invention are unsaturated monomers containing substantially no carboxyl group and having a Q value of at least 0.1 as determined by Q-e theory, preferably those having a Q value of 0.1 to 1.5. When the unsaturated monomer C having a Q value of less than 0.1 is used, the obtained copolymer tends not to cure at ambient temperatures. Usable examples are various acrylates or methacrylates, acrylonitrile or methacrylonitrile, acrylic or methacrylic amides, olefins having an aromatic or heterocyclic ring, dienes, etc. These monomers are used singly or in admixture with one another. Examples of the above-mentioned acrylates or methacrylates are versatile and include acrylates or methacrylates of alkyl having about 1 to 18 carbon atoms, alkoxy-substituted alkyl, allyl-substituted alkyl, amino-substituted alkyl, allyloxy-substituted alkyl, hydroxy substituted alkyl, glycidyl, etc. More specific examples are methyl acrylate or methacrylate, ethyl acrylate or methacrylate, propyl acrylate or methacrylate, butyl acrylate or methacrylate, 2-ethylhexyl acrylate, 2-ethylhexyl methacrylate, lauryl acrylate, lauryl methacrylate, stearyl acrylate or methacrylate, glycidyl acrylate or methacrylate, methoxybutyl acrylate or methacrylate, methoxyethyl acrylate or methacrylate, ethoxybutyl acrylate or methacrylate, allyl acrylate or methacrylate, hydroxyethyl acrylate or methacrylate, hydroxypropyl acrylate or methacrylate, diethylaminoethyl acrylate or methacrylate, allyloxyethyl acrylate or methacrylate, esterified product of glycidyl acrylate or glycidyl methacrylate with saturated fatty acid having 1 to 18 carbon atoms, etc. Examples of olefins having an aromatic or heterocylic ring are styrene, $\alpha$-methylstyrene, vinyltoluene, vinylpyridine, etc. Examples of dienes include butadiene, isoprene, chloroprene, etc. Exemplary of acrylic or methacrylic amides are N-methylolacrylamide, N-methylolmethacrylamide, N-butoxymethylacrylamide, N-butoxymethylmethacrylamide, etc.

Especially preferable to use are styrene, vinyltoluene and acrylic or methacrylic esters represented by the formula

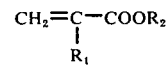

wherein $R_1$ is hydrogen or methyl, $R_2$ is alkyl with 1 to 8 carbon atoms, and $R_1$ is methyl when $R_2$ is ethyl.

The proportions of modified monomer A, unsaturated acid B and unsaturated monomer C used to prepare the copolymer are 7.5 to 95 wt.% for modified monomer A, 5 to 20 wt.% for unsaturated acid B and 0.01 to 87.5 wt.% for unsaturated monomer C, and are preferably about 25 to 80 wt.% for monomer A, about 7.5 to 17.5 wt.% for unsaturated acid B and about 5 to 67.5 wt.% for unsaturated monomer C. The copolymer usually has an acid value of about 25 to 150 and an average molecular weight of about 500 to 80,000, preferably an acid value of 45 to 130 and an average molcular weight of about 1,000 to 50,000.

The amount of modified monomer A, if less than 7.5 wt.% impairs curing property at ambient temperatures, also, if more than 95 wt.% is used, it is impossible to render the obtained copolymer water soluble.

On the other hand, if less than 5 wt.% of unsaturated acid B is used, it is difficult to render the obtained copolymer water soluble, but the amount more than 20 wt.% impairs water resistance of the cured coating film. Further, unsaturated monomer C is used to adjust the properties of the copolymer obtained. Thus constituent proportions outside the foregoing range is objectionable.

The polymerization of modified monomer A, unsaturated acid B and unsaturated monomer C can be conducted under the same conditions as in the conventional polymerization. For example, polymerization can be conducted in solvent in the absence or presence of a radical initiator or under irradiation of radiations. Initiators to be used are, for example, organic or inorganic peroxides, sulfides, sulfines, sulfinic acids, azo compounds, diazo compounds, nitroso compounds, redox initiators, etc. Besides there may be used actinic light, electron beam, $\gamma$-ray, X-ray, etc. singly or in combination with the above initiators.

The polymerization is carried out at a temperature of 0° to 200° C, preferably about 40° to 170° C for 1 to 20 hours, preferably for about 6 to 10 hours. Especially preferable is a polymerization method employing a solvent in which the copolymer obtained is soluble and which is miscible with water. This method has the advantage that the copolymer obtained is usable as it is for the preparation of aqueous coating composition of this invention without the necessity of removing the solvent from the copolymer. Examples of such water soluble solvent are solvents represented by ROH wherein R is alkyl having 1 to 4 or 6 carbon atoms, such as methyl alcohol, ethyl alcohol, propyl alcohol, butyl alcohol and hexyl alcohol; solvents represented by $HO—CH_2CH_2—OR$ wherein R is hydrogen or alkyl having 1 to 8 carbon atoms, such as ethylene glycol, ethylene glycol monobutyl ether and ethylene glycol monoethyl ether; solvents represented by $HO—CH_2C-H_2—OCH_2CH_2OR$ wherein R is the same as above, such as diethylene glycol, diethylene glycol monomethyl ether and diethylene glycol monobutyl ether; solvents represented by $R_1O—CH_2CH_2—OR_2$ wherein $R_1$ and $R_2$ are each alkyl having 1 to 3 carbon atoms, such as ethylene glycol dimethyl ether; solvents represented by $R_1O—CH_2CH_2OCH_2—CH_2OR_2$ wherein $R_1$ and $R_2$ are the same as above, such as diethylene glycol dimethyl ether; solvents represented by $RO—CH_2C-H_2OCO—CH_3$ wherein R is the same as above, such as ethylene glycol monoacetate and ethylene glycol monomethyl ether acetate; diacetone alcohol; dioxane; tetrahydrofuran; acetone; dimethylformamide; etc. For the preparation of the copolymer of this invention, water insoluble solvents are also usable if they have a boiling point of up to 250° C, because such solvents are removable by distillation at atmospheric or reduced pressure after the completion of the polymerization reaction. These solvents include, for example, toluene, xylene and like aromatic solvents.

The amount of such solvent, which is variable over a wide range, is usually about 15 to 90 wt.%, preferably about 30 to 75 wt.%, based on the copolymer solution.

To render the copolymer thus prepared soluble or dispersible in water, the carboxyl groups in the copolymer are neutralized with a neutralizing agent. Useful for this purpose are a wide variety of known neutralizing agents such as hydroxides, carbonates or bicarbonates of alkali metals, ammonia and amines. Examples of amines are primary, secondary and tertiary alkylamines or aliphatic amines and primary, secondary and tertiary alkanol amines or alicyclic amines, etc. Preferable examples of hydroxides of alkali metals are lithium hydroxide, sodium hydroxide, potassium hydroxide, etc., those of alkali metal carbonates are sodium carbonate, potassium carbonate, etc. and those of alkali metal bicarbonates include lithium bicarbonate, sodium bicarbonate and potassium bicarbonate. The copolymer is effectively neutralized under conventional conditions; for example, the copolymer is contacted with a neutralizing agent, preferably with an aqueous solution thereof.

The vinyl polymer emulsion, another component of the aqueous coating composition of this invention must be one prepared by subjecting a vinyl monomer to emulsion polymerization in an aqueous medium in the presence of maleinized polybutadiene serving as a dispersion stabilizer. The vinyl polymer emulsion prepared in the presence of the specified dispersion stabilizer has been developed by one of the present inventors.

In the preparation of the vinyl polymer emulsion to be used in this invention, it is critical that a vinyl monomer be subjected to emulsion polymerization in the presence of maleinized polybutadiene. Whereby, graft polymerization of the vinyl monomer with the maleinized polybutadiene occurs effectively during the polymerization step. The coating film obtained from the resultant polymer emulsion can be cured sufficiently without using curing agent to produce a cured film having higher order of film performance. When for example a vinyl monomer is subjected to emulsion polymerization in the absence of maleinized polybutadiene, and a maleinized polybutadiene is then added to the resulting vinyl polymer, the emulsion obtained fails to have higher order of film performance because graft polymerization of the vinyl monomer with the maleinized polybutadiene does not occur. Further, a dispersion stabilizer other than the maleinized polybutadiene should be employed in the above emulsion polymerization, with the result that the obtained emulsion is especially poor in water resistance.

The vinyl monomer usable as the starting material is one having a Q value of at least 0.1. Examples of the vinyl monomers are alkyl ($C_1$ to $C_{18}$) esters of acrylic or methacrylic acid, glycidyl acrylate, glycidyl methacrylate, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, hydroxypropyl methacrylate, diethylaminoethyl methacrylate, allyloxyethyl acrylate, allyloxyethyl methacrylate, styrene, α-methyl styrene, vinyl toluene, vinyl pyridine, butadiene, isoprene, chloroprene, acrylonitrile, methacrylonitrile, esterified product of glycidyl acrylate or methacrylate with saturated or unsaturated fatty acid having 1 to 26 carbon atoms, esterified product of glycidyl acrylate or methacrylate with alkyl ($C_1$ to $C_6$) substituted benzoic acid, etc. Preferable examples of the vinyl monomers are alkyl ($C_2$ to $C_8$) esters of acrylic or methacrylic acid and styrene. These vinyl monomers can be used alone or in admixture with one another. Other water soluble or hydrophilic vinyl monomers may be used together with the above vinyl monomers in an amount of lower than 10 wt. % based on the above vinyl monomer. The examples of the latter are, for example, acrylic acid, methacrylic acid, itaconic acid, acrylamide, N-methyl acrylamide, N-ethylacrylamide, methacryl amide, diethylaminoethyl methacrylate, N-methylol acrylamide, N-methylol methacrylamide, N-methylol acrylamide butyl ether, 2-hydroxyethyl acrylate, 2-hydroxyethyl methacrylate, 2-hydroxypropyl acrylate, 2-hydroxypropyl methacrylate, acrolein, hydroxy methylated diacetone acrylamide, diacetone acrylamide, etc.

Preparation methods of the maleinized polybutadiene and vinyl polymer emulsion are described by Yasuharu Nakayama in U.S. application Ser. No. 239,733 which is copending.

Usable as the maleinized polybutadiene which serves as a dispersion stabilizer are those prepared by maleinizing polybutadienes with maleic acid and/or anhydride thereof. These polybutadienes include homopolymers of butadiene, copolymers of butadiene with other copolymerizable monomers and modified products of these homopolymers and copolymers. These polybutadienes have a number average molecular weight usually of about 200 to 40,000 preferably about 500 to 10,000. Polybutadienes having a number average molecular weight of less than 200, when maleinized, almost fail to serve as high molecular weight dispersion stabilizers, merely acting as low molecular weight dispersion stabilizers. When these polybutadienes act as low molecular weight dispersion stabilizers, polybutadienes can not be used in this invention, since these polybutadienes become a part of coating film. Those having a number average molecular weight of greater than about 40,000 are not desirable, because they tend to be exceedingly viscous and are not amenable to maleinization. The homopolymers of butadiene may be any structure of 1,2-vinyl bond, 1,4-trans bond and 1,4-cis bond and mixture thereof. The copolymers of butadiene are those containing at least 10 wt.%, preferably at least 40 wt.% of butadiene. The monomers to be copolymerized with butadiene are, for example, isoprene, chloroprene, cyclopentadiene and like olefins having about 2 to 18 carbon atoms; acrylic acid, methacrylic acid and alkyl ($C_1$ to $C_{16}$) esters thereof; styrene compounds such as styrene, α-methylstyrene, vinyltoluene; acrylonitrile, methacrylonitrile, etc.

The modified products of the homopolymer and copolymer of butadiene include, for example, partially hydrogenated butadiene polymers, cyclized butadiene polymers, hydroxyl butadiene polymers and epoxidized butadiene polymers. It is preferable that the modified butadiene polymer retains more than 60% of the double bond contained in the original butadiene polymer.

Polybutadienes are maleinized under known conditions. Specifically stated, polybutadiene and maleic acid and/or anhydride thereof are placed into a reactor, along with a solvent when so desired, and the mixture is heated to about 120° to 250° C, preferably to 150° to 210° C, under nitrogen atmosphere with stirring. For maleinization, about 2 to 100 wt. parts, preferably about 4 to 80 wt. parts, of maleic acid and/or anhydride thereof is used per 100 wt. parts of polybutadiene. When maleic acid is used for maleinization, the maleinized polybutadiene is used as a dispersion stabilizer after the carboxyl groups have been neutralized. Further when maleic anhydride is used, the product is subjected to ring cleavage with water, alcohol, ammonia, amine or the like to obtain a dicarboxylate, half ester or half amide. The remaining carboxyl groups are then neutralized, and the product is used as a dispersion stabilizer. For neutralization, the maleinized polybutadiene is brought into contact, preferably in an aqueous medium, with an alkali metal hydroxide, carbonate or bicarbonate, ammonia, amine or the like. In this case the same alkali metal hydroxide, carbonate, or bicarbonate, ammonia and amine as mentioned before are usable.

The maleinized polybutadiene thus prepared has an acid value usually of about 20 to 350, preferably of about 40 to 200. With an acid value of less than 20, the polybutadiene fails to act fully effectively as a dispersion stabilizer, whereas if the acid value is in excess of 350, a coating film resulting from the product tends to be poor in water resistance and salt water spray resistance.

According to this invention, the maleinized polybutadiene is used in such amount that the acid value of the total solid content resulting from the emulsion polymerization of the vinyl monomer is in the range of about 5 to 150. With such amount that the acid value of all the solids is less than 5, insufficient emulsification will result, whereas if the amount is such that the acid value is in excess of 150, the coatings obtained tend to exhibit poor water resistance. More preferably, the maleinized polybutadiene is used in such amount that the acid value is 15 to 120. When the acid value is in this range, the coating composition formulated gives coatings which are especially excellent in alkali resistance and water resistance.

According to this invention, the vinyl monomer is subjected to emulsion polymerization using a maleinized polybutadiene, in the absence of catalyst or in the presence of a radical polymerization initiator or with irradiation of radical generating radiation such as gamma rays. The polymerization is effected in an aqueous medium, with stirring or in stationary state, at a temperature higher than the freezing point but not higher than the boiling point of water. Although emulsion polymerization is carried out generally with stirring, the vinyl monomer is emulsified before the polymerization reaction according to this invention, this making it possible to effect emulsion polymerization without stirring. Effectively usable as the radical polymerization initiator or polymerization initiating agent are water-soluble or oil-soluble agents and other means, including, for example, active rays, the combination of photochemical sensitizing agents and active rays, ionizing radiations, ultrasonic waves, organic or inorganic peroxides, sulfides, sulfines, sulfinic acids, sulfonic acids, azo compounds, diazo compounds, nitroso compounds, persulfuric acid compounds, perchloric acid compounds, water- or oil-soluble redox polymerization initiators, etc.

With the vinyl polymer emulsion prepared by the emulsion polymerization of vinyl monomer using the maleinized polybutadiene as a dispersion stabilizer, the maleinized polybutadiene remains as such in the polymer emulsion, so that when the vinyl polymer emulsion is formed into a coating film, the intermolecular reaction of the maleinized polybutadiene forms a reticular structure to give a tough coating film. For this purpose, namely to promote the curing reaction, it is very effective to incorporate a drier into the emulsion. Suitable driers are those generally used in oily coating compositions or polybutadiene-type coating compositions. The drier is ordinarily incorporated by dispersing it in the emulsion resulting from emulsion polymerization or by dissolving it in the vinyl monomer before emulsion polymerization.

The aqueous coating composition of this invention can be formulated by uniformly mixing together the vinyl polymer emulsion prepared in the presence of maleinized polybutadiene as a dispersion stabilizer, and the copolymer composed of the modified monomer A, unsaturated acid B and unsaturated monomer C. The copolymer and the vinyl polymer emulsion are used in the ratio by weight of the copolymer to the emulsion (calculated as the total amount of the polymer and maleinized polybutadiene contained in the emulsion) in the range of from 99.7 : 0.3 to 0.3 : 99.7, preferably from 90 : 10 to 10 : 90. To mix the copolymer with the vinyl polymer emulsion, the copolymer may be directly added to and mixed with the emulsion, or the copolymer is dispersed in an aqueous medium to prepare an aqueous solution or an emulsion, which is then mixed with the vinyl polymer emulsion.

The composition of this invention may contain various coloring pigments, extender pigments and driers as desired.

Examples of extender pigments are calcium carbonate, clay, talc, white carbon, etc. Usable as driers are a wide variety of known driers such as cobalt naphthenate, lead naphthenate, etc. Where necessary, it is possible to add a dispersant, stabilizer, defoamer, preservatives and like additives.

Because of the synergic effects achieved by the vinyl polymer emulsion containing a maleinized polybutadiene as a dispersion stabilizer and the copolymer of modified monomer A, unsaturated acid B and unsaturated monomer C, the aqueous coating composition of this invention is curable rapidly at ambient temperatures and gives coatings which are outstanding in gloss, water resistance, solvent resistance, corrosion resistance and salt water resistance. Also, it can be made to cure at a greatly increased velocity with heating without any adverse effect.

For a better understanding of the invention, Examples are shown below, in which percentages and parts are all by weight unless otherwise specified. Example 1 shows preparation of maleinized polybutadiene. Examples 2 to 6 show preparation of vinyl polymer emulsion using the maleinized polybutadiene obtained in Example 1. Examples 7 to 9 show preparation of copolymer, and Examples 10 to 11 show preparation of aqueous coating composition.

EXAMPLE 1

In a 1-l autoclave are placed 200 parts of polybutadiene having a molecular weight of 3,000, and containing 8% of 1,4-cis bonds and 92% of 1,2-vinyl bonds, 80 parts of maleic anhydride, 80 parts of methyl isobutyl ketone and 128 parts of xylene. After replacing the air in the autoclave by nitrogen, the mixture is reacted at 185° to 195° C for 5 hours with vigorous stirring. After removing the solvent and excess maleic anhydride from the reaction product, 60 parts of ethyl acetate, 64 parts of methanol and 16 parts of water are added to the product. The mixture is maintained at 60° C for 6 hours with stirring. To the resulting mixture is then added 60 parts of ethylene glycol monobutyl ether, this being followed by removal of methanol, water and ethyl acetate using an evaporator. The product obtained has an acid value of 74 and the solution has a concentration of 77%.

EXAMPLE 2

Into a 1-l reactor are placed 332 parts of water, 5.7 parts of 28% ammonia water, 2.8 parts of ethylene glycol monobutyl ether, 88 parts of the maleinized polybutadiene obtained in Example 1, 0.4 part of ammonium persulfate and 172 parts of n-butyl methacrylate, which are then heated at 70° to 85° C for 3 hours with stirring under nitrogen gas atmosphere to produce a vinyl polymer emulsion (1) having a solid content of 40%, pH of 8.8 and viscosity of 80 poise.

EXAMPLES 3 to 6

Each of vinyl polymer emulsions is prepared in the same manner as in Example 2 except that the specified vinyl monomer is used in the specified amount shown in Table 1 in place of 172 part of n-butyl methacrylate.

EXAMPLE 7

(7-a)

Into a 1-l reactor are placed 236 parts of linseed oil fatty acid, 119 parts of glycidyl methacrylate, 0.4 part of hydroquinone and 0.2 part of tetraethyl ammonium bromide, which are than heated at 140° – 150° C with stirring. The amount of residual carboxyl groups is measured to confirm the progress of the reaction between epoxy groups and carboxyl groups. The reaction is completed in about 4 hours to produce monomer (7-a) modified with the fatty acid.

(7-b)

Into a 1-l reactor 100 parts of ethylene glycol monobutyl ether is placed and heated at 120° C, to which a mixture of 40 parts of the monomer (7-a), 47 parts of n-butyl methacrylate, 13 parts of acrylic acid and 5 parts of azobisdimethylvaleronitrile is added dropwise over a period of about 2 hours at the same temperature with stirring. The reaction is conducted under nitrogen atmosphere. To the resulting reaction product 1 part of azobisisobutyronitrile is added 1 hour after the addition of the mixture and 1 part of azobisisobutyronitrile is further added 2 hours after the first addition of the azobisisobutyronitrile. The mixture is thereafter maintained at the same temperature for 3 hours for further reaction to produce copolymer (7-b) having an acid value of 91 and a conversion of 99.5%.

(7-c)

Into a 1-l reactor is placed 50 parts of ethylene glycol monobutyl ether, which is then heated at 120° C and to which a mixture of 60 parts of the monomer (7-a), 30 parts of n-butyl methacrylate, 10 parts of acrylic acid and 4 parts of azobisisobutyronitrile is added dropwise at the same temperature over a period of about 2 hours with stirring while the interior air is being replaced by nitrogen gas. Two 1-part portions of azobisisobutyronitrile are added to the resulting reaction product 1 hour after and 3 hours after the addition of the mixture, each portion respectively. The resulting mixture is kept at the same temperature for three hours for further reaction to produce copolymer (7-c) having an acid value of 75 and a conversion of 99.7%.

EXAMPLE 8

(8-a)

Into a 1-l reactor are placed 236 parts of safflower oil fatty acid, 119 parts of glycidyl methacrylate and 0.3 part of hydroquinone, and the resultant mixture is allowed to react at 140° to 150° C for about 5 hours with stirring. The progress of the reaction is ascertained in the same manner as in (7-a) of Example 1 to find that the reaction takes about 5 hours for completion.

(8-b)

Table 1

| Vinyl monomer | Example 3 | Example 4 | Example 5 | Example 6 |
| --- | --- | --- | --- | --- |
| Kind and amount (part) | Styrene 86 | Styrene 105 | Iso-butyl methacrylate 129 | Iso-butyl methacrylate 129 |
|  | n-Butyl acrylate 86 | 2-Ethylhexyl acrylate 67 | n-Butyl acrylate 43 | 2-Ethylhexyl acrylate 43 |
| Solid content (%) | 40 | 40 | 40 | 40 |
| pH | 8.4 | 8.6 | 8.8 | 8.8 |
| Viscosity (poise) | 108 | 103 | 40 | 73 |

To 50 parts of ethylene glycol monobutyl ether kept at 120° C in a 1-l reactor is dropwise added, over a period of about 2 hours with stirring, a mixture of 40 parts of the reaction product (8-a), 47 parts of styrene, 13 parts of acrylic acid and 5 parts of azobisdimethylvaleronitrile. The reaction is conducted under nitrogen atmosphere. An hour after the completion of the addition, 1 part of azobisdimethylvaleronitrile is added to the reaction mixture and, 2 hours later, 1 part of azobisdimethylvaleronitrile is further added. The resultant mixture is then allowed to react at 120° C for 2.5 hours to produce a polymer having a conversion of 99.2% and an acid value of 91.

(8-c)

To 50 parts of ethylene glycol monobutyl ether kept at 120° C in a 1-l reactor is added dropwise, over a period of 2 hours with stirring, a mixture of 40 parts of the reaction product (8-a), 44 parts of n-butyl methacrylate, 16 parts of methacrylic acid and 4.5 parts of azobisdimethylvaleronitrile with the air in the reactor replaced by nitrogen. An hour after the completion of the addition, 1 part of azobisisobutyronitrile is added to the reaction mixture and, two hours later, 1 part of azobisisobutyronitrile is further added. The resulting mixture is kept for further reaction at 120° C for 3 hours to produce a polymer having a conversion of 99.5% and an acid value of 97.

(8-d)

To 100 parts of ethylene glycol monobutyl ether kept at 120° C in a 1-l reactor is added dropwise, over a period of 2 hours with stirring, a mixture of 90 parts of the reaction product (8-a), 2 parts of n-butyl methacrylate, 8 parts of acrylic acid and 5 parts of azobisdimethylvaleronitrile, with the air in the reactor replaced by nitrogen. An hour after the completion of the addition, 1 part of azobisisobutyronitrile is added to the reaction mixture and, 2 hours later, 1 part of azobisisobutyronitrile is further added. The resultant mixture thus obtained is allowed to react at 120° C for 3 hours to produce a polymer having a conversion of 99.7% and an acid value of 58.

(8-e)

To 50 parts of ethylene glycol monoethyl ether kept at 120° C in a reactor is added dropwise, over a period of 2 hours with stirring, a mixture of 40 parts of the reaction product (8-a), 23 parts of methyl methacrylate, 24 parts of n-butyl methacrylate, 13 parts of acrylic acid and 5 parts of azobisisobutyronitrile, with the air in the reactor replaced by nitrogen. An hour after the completion of the addition, 1 part of azobisisobutyronitrile is added to the reaction mixture and, 2 hours later, 1 part of azobisisobutyronitrile is further added. The resultant mixture obtained is allowed to react at 120° C for 3 hours to produce a polymer having a conversion of 99.8% and an acid value of 92.

EXAMPLE 9

(9-a)

Into a 1-l reactor 236 parts of soybean oil fatty acid, 119 parts of glycidyl methacrylate and 0.3 part of hydroquinone are placed. The mixture is allowed to react at 140° to 150° C with stirring. The reaction takes about 6 hours for completion, as determined in the same manner as in (7-a) of Example 7, (9-b)

To 50 parts of diethylene glycol monobutyl ether kept at 120° C in a reactor is added dropwise, over a period of about 2 hours with stirring, a mixture of 40 parts of the reaction product (9-a), 23 parts of styrene, 24 parts of n-butyl methacrylate, 13 parts of acrylic acid and 5 parts of azobisdimethylvaleronitrile. The mixture is allowed to react while being maintained at a temperature of 120° C under nitrogen atmosphere. To the reaction mixture is added 1 part of azobisisobutyronitrile 1 hour after the dropwise addition, this being followed by further addition of 1 part of the same nitrile 2 hours later. The reaction is thereafter continued at 120° C for 3 hours to give a polymer having a conversion of 99.3% and an acid value of 90.

(9-c)

Into a 1-l reactor 50 parts of ethylene glycol monobutyl ether is placed, which is heated to 120° C. To the solution is added dropwise, over a period of 2 hours with stirring, a mixture of 12 parts of the reaction product (7-a), 28 parts of the reaction product (8-a), 23 parts of styrene, 24 parts of n-butyl methacrylate, 13 parts of acrylic acid and 5 parts of azobisisobutyronitrile. The mixture is allowed to react in the same manner as above (9-b) with the addition of azobisisobutyronitrile to obtain a polymer having an acid value of 92 and a conversion of 99.5%.

The copolymer modified with fatty acid and prepared in Examples 7 to 9 are neutralized with about 1.0 equivalent of 28% ammonia water based on the carboxyl groups in the copolymer. The resin of (8-e) of Example 8 only is neutralized with 1.0 equivalent of triethylamine. Thus the copolymers are formulated into aqueous solutions.

EXAMPLE 10

The emulsion obtained in Example 2 and the aqueous solutions of the copolymers prepared in (8-c) and (8-e) of Example 8 are mixed together in the ratios given in Table 2 below to prepare aqueous coating compositions of this invention. Each of the compositions is applied to a glass plate to a coating dry film thickness of 25 $\mu$, and is dried at 20° C and at a humidity of 75% for 5 days. Subsequently, the coating film is peeled off and placed into tetrahydrofuran, heated to 40° C, for 24 hours for extraction. The resulting change in the weight of the coating film is measured, with the result also listed in Table 2. The larger the value in the table, the higher is the degree of curing. The calculated value is determined based on the individual gel fraction percentages and proportionally in relation to the mixing ratio. The results given in the table show that the mixture systems of this invention have gel fraction percentages which are exceedingly higher than the calculated values, evidencing that the two components, namely the copolymer and the vinyl polymer emulsion produce synergic effects.

Table 2

| Copolymer of Ex. (8-c)/ Emulsion of Ex. 2 | 100/0 | 90/10 | 80/20 | 70/30 | 50/50 | 25/75 | 0/100 |
|---|---|---|---|---|---|---|---|
| Gel fraction percentage (%) | | | | | | | |
| Measured | 4 | 48 | 54 | 59 | 60 | 78 | — |
| Calculated | — | 11 | 19 | 26 | 41 | 60 | — |
| Copolymer of Ex. (8-e)/ Emulsion of Ex. 2 | 100/0 | 90/10 | 80/20 | 70/30 | 50/50 | 25/75 | 0/100 |

Table 2-continued

| Gel fraction percentage (%) | | | | | | | |
|---|---|---|---|---|---|---|---|
| Measured | 3 | 40 | 41 | 48 | 58 | 75 | 80 |
| Calculated | — | 11 | 19 | 26 | 41 | 60 | — |

Note: Mixing ratios are all ratios of solids.

EXAMPLE 11

The copolymers prepared in Examples 7 to 9 and the vinyl polymer emulsion obtained in Example 2 are mixed together in the ratio by weight of 25 : 75 calculated as resin solids to formulate aqueous coating compositions of this invention. The coatings prepared from these coating compositions are tested to determine the properties thereof, with the results stated in Table 3 below. For reference, the copolymers of Examples 7 to 9 and the vinyl polymer emulsions of Examples 2 to 6 are individually singly applied to form coatings, which are similarly tested with the results indicated in Tables 4 and 5. Specified amounts of driers and pigments are incorporated into the aqueous coating compositions. Thus 0.5 weight part of lead naphthenate and 0.05 weight part of cobalt naphthenate, each calculated as the amount of the metal, are used per 100 weight parts of resin solids. The pigments are dispersed with a usual paint conditioner.

The aqueous coating compositions obtained are applied to polished mild steel sheets of 0.7 mm thickness to form coating films, which are tested to determine the properties thereof. The compositions are applied by a bar coater. The viscosity is adjusted with water and water-soluble solvent (ethylene glycol monobutyl ether). The coating film is about 25-micron thick and is dried at 20° C at a humidity of 75% for 7 days. Test methods which are employed to determine the properties of coating film are as follows.

PENCIL HARDNESS

After a specimen has been left for 24 hours in a thermo-hydrostated chamber maintained at a temperature of 20 ± 1° C and a relative humidity of 75 ± 3%, it is set horizontally in the chamber and strongly scratched with a sharpened pencil. The value is expressed by the hardness of the hardest pencil which can not make a scratch on the coated surface.

GLOSS VALUE

It is the measured value of reflectance percent of a mirror surface at an angle of 60° according to ASTM D-333.

ERICHSEN VALUE

Determined by an Erichsen tester at 20° C according to JIS Z 2247.

CROSS-CUT TEST 100 of squares reaching to the substrate are cut at intervals of 1 mm on the surface film coated on a soft iron plate. Adhesive tape is stuck onto it, pressed uniformly with a uniform force and peeled off rapidly. The number of remaining squares is counted and expressed as follows.

Evaluation = S/100
S : number of remaining squares

The coated plate is put in a thermo-hydrostated chamber maintained at a temperature of 20 ± 1° C and a relative humidity of 75 ± 3% for an hour, and then this grid test is carried out using the same chamber.

WATER RESISTANCE

After a specimen has been immersed in tap water at 20° C for 2 weeks, the state of coating film is observed.

SOLVENT RESISTANCE

After a specimen has been immersed in gasoline (Trade mark: "Silver Gasoline", product of Nippon Oil Co., Ltd., Japan) at 20° C for 2 weeks, the state of coating film is observed.

WEATHER RESISTANCE

Accelerated weather resistance is determined in terms of the gloss retentivity of the coating film which is exposed to a weather-o-meter of sunshine type for 250 hours.

STORAGE STABILITY

The viscosity of coating composition is measured by Kreb's Stormer viscometer after the composition has been left to stand at 40° C for 40 days. The results are given in Table 1.

DU PONT IMPACT TEST

After leaving a test panel to stand in a constant temperature and constant humidity chamber at a temperature of 20 ± 1° C and a humidity of 75 ± 3% for 1 hour, the following test is conducted in the same chamber. A bearer and a center of impact of prescribed sizes are fitted to a Du Pont impact tester and a test panel is put between them, turning the coated surface of the test panel upward. The prescribed weight is dropped on the center of impact from the prescribed height, the test panel is taken out, and after it has been left for an hour in the room, the damage of surface is observed. The largest height (cm) of the weight entailing no cracking in the coating is determined.

CORROSION RESISTANCE

The corrosion resistance is determined by applying a 5% aqueous solution of sodium chloride to the coating film on which a cross-cut is drawn up to the substrate for 24 hours and inspecting the coated substrate for corrosion.

Table 3

| Copolymer (Ex. No.) mixed with the Emulsion of Ex. 2 | (7-b) | (7-c) | (8-b) |
|---|---|---|---|
| Coating composition | | | |
| Amount of resins in the mixture | 100 | 100 | 100 |
| Rutile-type titanium dioxide | 80 | 80 | 80 |
| Water | 71 | 82 | 83 |
| Properties of coating | | | |
| Pencil hardness | B | B | HB |
| Impact strength (cm) | 40 | 40 | 25 |
| Erichsen value (mm) | >8.0 | >8.0 | >8.0 |
| Cross-cut test | 100/100 | 100/100 | 100/100 |
| Water resistance | No change | No change | No change |
| solvent resistance | No | No | No |

Table 3-continued

| | | | |
|---|---|---|---|
| Corrosion resistance | No change | No change | No change |
| Weather resistance | | | |
| Initial gloss | 78 | 80 | 70 |
| Gloss in 250 days | 70 | 71 | 50 |
| Storage stability | | | |
| Initial viscosity (K,u) | 90 | 86 | 83 |
| Viscosity in 40 days (K,u) | 89 | 86 | 83 |

| Copolymer (Ex. No.) mixed with the emulsion of Ex. 2 | (8-c) | (8-d) | (8-e) |
|---|---|---|---|
| Coating composition | | | |
| Amount of resins in the mixture | 100 | 100 | 100 |
| Rutile-type titanium dioxide | 80 | 80 | 80 |
| Water | 82 | 70 | 84 |
| Properties of coating | | | |
| Pencil hardness | B | B | B |
| Impact strength (cm) | 40 | 30 | 40 |
| Erichsen value (mm) | >8.0 | >8.0 | >8.0 |
| Cross-cut test | 100/100 | 100/100 | 100/100 |
| Water resistance | No change | No change | No change |
| Solvent resistance | No change | No change | No change |
| Corrosion resistance | No change | No change | No change |
| Weather resistance | | | |
| Initial gloss | 80 | 79 | 79 |
| Gloss in 250 days | 70 | 71 | 65 |
| Storage stability | | | |
| Initial viscosity (K,u) | 88 | 87 | 89 |
| Viscosity in 40 days (K,u) | 86 | 86 | 88 |

Table 3-continued

| Copolymer (Ex. No.) mixed with the emulsion of Ex. 2 | (9-b) | (9-c) | Comparison Example* |
|---|---|---|---|
| Coating composition | | | |
| Amount of resins in the mixture | 100 | 100 | 100 |
| Rutile-type titanium dioxide | 80 | 80 | 80 |
| Water | 84 | 85 | 170 |
| Properties of coating | | | |
| Pencil hardness | HB | HB | 2B |
| Impact strength (cm) | 40 | 40 | 40 |
| Erichsen value (mm) | >8.0 | >8.0 | >8.0 |
| Cross-cut test | 100/100 | 100/100 | 100/100 |
| Water resistance | No change | No change | Blistering in 2 days |
| Solvent resistance | No change | No change | No change |
| Corrosion resistance | No change | No change | No change |
| Weather resistance | | | |
| Initial gloss | 76 | 78 | 84 |
| Gloss in 250 days | 68 | 67 | 52 |
| Storage stability | | | |
| Initial viscosity (K,u) | 87 | 88 | 88 |
| Viscosity in 40 days (K,u) | 88 | 88 | Separation into two layers |

Note:* The composition is prepared by reacting 0.9 mole of linseed oil fatty acid, 0.6 mole of pentaerythritol, 0.4 mole of trimethylolethane and 1.0 mole of phthalic anhydride in a usual manner, reacting 0.5 mole of phthalic anhydride with the resulting product to obtain an alkyd resin having an acid value of 55, neutralizing the resin with ammonia water to prepare a 50% aqueous solution, and adding to the solution 1 weight part of lead naphthenate and 0.1 weight part of cobalt naphthenate, each calculated as the amount of the metal, per 100 weight parts of the resin solids, the naphthenates being driers.

Table 4

| Copolymer (Ex. No.) | (7-b) | (7-c) | (8-b) |
|---|---|---|---|
| Coating composition | | | |
| Amount of resins in the mixture | 100 | 100 | 100 |
| Rutile-type titanium dioxide | 80 | 80 | 80 |
| Water | 194 | 228 | 230 |
| Properties of coating | | | |
| Pencil hardness | >6B | >6B | HB |
| Impact strength (cm) | 40 | 40 | 20 |
| Erichsen value (mm) | >8.0 | >8.0 | 7.0 |
| Cross-cut test | 100/100 | 100/100 | 100/100 |
| Water resistance | No gloss in 1 day | No gloss in 1 day | No change |
| Solvent resistance (min.) | Peeling in 10 | Peeling in 10 | Peeling in 30 |
| Corrosion resistance | Poor | Poor | Good |
| Weather resistance | | | |
| Initial gloss | 88 | 89 | 90 |
| Gloss in 250 days | 80 | 81 | 80 |
| Storage stability | | | |
| Initial viscosity (K,u) | 89 | 88 | 86 |
| Viscosity in 40 days (K,u) | 81 | 80 | 78 |

| Copolymer (Ex. No.) | (8-c) | (8-d) | (8-e) |
|---|---|---|---|
| Coating composition | | | |
| Amount of resins in the mixture | 100 | 100 | 100 |
| Rutile-type titanium dioxide | 80 | 80 | 80 |
| Water | 240 | 195 | 227 |
| Properties of coating | | | |
| Pencil hardness | >6B | >6B | 5B |
| Impact strength (cm) | 40 | 20 | 40 |
| Erichsen value (mm) | >8.0 | >8.0 | >8.0 |
| Cross-cut test | 100/100 | 100/100 | 100/100 |
| Water resistance | No gloss in 1 day | No gloss in 1 day | No gloss in 1 day |
| Solvent resistance (min.) | Peeling in 10 | Peeling in 10 | Peeling in 10 |
| Corrosion resistance | Poor | Poor | Poor |
| Weather resistance | | | |
| Initial gloss | 86 | 92 | 87 |
| Gloss in 250 days | 76 | 81 | 80 |
| Storage stability | | | |
| Initial viscosity (K,u) | 88 | 87 | 86 |

Table 4-continued

| | | | |
|---|---|---|---|
| Viscosity in 40 days (K,u) | 81 | 80 | 79 |

| Copolymer (Ex. No.) | (9-b) | (9-c) |
|---|---|---|
| Coating composition | | |
| Amount of resins in the mixture | 100 | 100 |
| Rutile-type titanium dioxide | 80 | 80 |
| Water | 230 | 232 |
| Properties of coating | | |
| Pencil hardness | 5B | 5B |
| Impact strength (cm) | 40 | 40 |
| Erichsen value (mm) | >8.0 | >8.0 |
| Cross-cut test | 100/100 | 100/100 |
| Water resistance | No gloss in 1 day | No gloss in 1 day |
| Solvent resistance (min.) | Peeling in 20 | Peeling in 20 |
| Corrosion resistance | Poor | Poor |
| Weather resistance | | |
| Initial gloss | 93 | 92 |
| Gloss in 250 days | 80 | 81 |
| Storage stability | | |
| Initial viscosity (K,u) | 88 | 89 |
| Viscosity in 40 days (K,u) | 78 | 80 |

Table 5

| Emulsion (Ex. No.) | 2 | 3 | 4 |
|---|---|---|---|
| Coating composition | | | |
| Amount of resins in the mixture | 100 | 100 | 100 |
| Rutile-type titanium dioxide | 80 | 80 | 80 |
| Water | — | — | — |
| Properties of coating | | | |
| Pencil hardness | B | B | HB |
| Impact strength (cm) | 35 | 40 | 35 |
| Erichsen value (mm) | >8.0 | >8.0 | >8.0 |
| Cross-cut test | 100/100 | 100/100 | 100/100 |
| Water resistance | No change | No change | No change |
| solvent resistance | No change | No change | No change |
| Corrosion resistance | Poor | Poor | Poor |
| Weather resistance | | | |
| Initial gloss | 50 | 48 | 48 |
| Gloss in 250 days | — | — | — |
| Storage stability | | | |
| Initial viscosity (K,u) | 88 | 87 | 90 |
| Viscosity in 40 days (K,u) | 89 | 87 | 91 |

| Emulsion (Ex. No.) | 5 | 6 |
|---|---|---|
| Coating composition | | |
| Amount of resins in the mixture | 100 | 100 |
| Rutile-type titanium dioxide | 80 | 80 |
| Water | — | — |
| Properties of coating | | |
| Pencil hardness | B | HB |
| Impact strength (cm) | 30 | 35 |
| Erichsen value (mm) | >8.0 | >8.0 |
| Cross-cut test | 100/100 | 100/100 |
| Water resistance | No change | No change |
| Solvent resistance | No change | No change |
| Corrosion resistance | Poor | Poor |
| Weather resistance | | |
| Initial gloss | 51 | 47 |
| Gloss in 250 days | — | — |
| Storage stability | | |
| Initial viscosity (K,u) | 86 | 87 |
| Viscosity in 40 days (K,u) | 86 | 88 |

The test results given in Tables 4 to 5 reveal that with respect to the properties of coatings cured by drying at 20° C for 5 days, the coating film prepared from the copolymers alone is inferior in hardness and in resistance to water, solvent and corrosion (see Table 4) and that prepared from the vinyl polymer emulsion alone is inferior in corrosion resistance and in initial gloss (see Table 5), whereas those prepared from the coating compositions of this invention containing these two components, because of the synergic effects thereof, exhibit outstanding properties, free of the above-mentioned drawbacks (see Table 3).

What we claim is:

1. In an aqueous coating compositon comprising a vinyl polymer emulsion prepared by subjecting a vinyl monomer to emulsion polymerization in an aqueous medium in the presence of maleinized polybutadiene used as a dispersion stabilizer, an improvement which is characterized in that at least one copolymer is further incorporated, said copolymer being composed of (A) at least one monomer prepared by reacting one glycidyl ester of acrylic acid and methacrylic acid with at least one fatty acid of drying oil fatty acid and semi-drying oil fatty acid, (B) at least one $\alpha,\beta$-ethylenically unsaturated acid and (C) at least one unsaturated monomer containing substantially no carboxyl group and having a Q value of at least 0.1 as determined by Q-e theory.

2. The aqueous coating composition according to claim 1, in which said monomer (A) is prepared by reacting one mole of at least one fatty acid of drying oil fatty acid and semi-drying oil fatty acid with 0.8 to 1.2 moles of at least one glycidyl ester of acrylic acid and methacrylic acid.

3. The aqueous coating composition according to claim 1, in which said fatty acid is at least one species selected from the group consisting of safflower oil fatty acid, linseed oil fatty acid, soybean oil fatty acid, perilla oil fatty acid, tall oil fatty acid, sunflower oil fatty acid and hempseed oil fatty acid.

4. The aqueous coating composition according to claim 1, in which said $\alpha,\beta$-ethylenically unsaturated acid is at least one species selected from the group consisting of acrylic acid, methacrylic acid, crotonic acid, maleic acid, maleic anhydride and fumaric acid.

5. The aqueous coating composition according to claim 1, in which said Q value is 0.1 to 1.5.

6. The aqueous coating composition according to claim 1, in which said unsaturated monomer (C) is at least one species selected from the group consisting of styrene, vinyltoluene and acrylic or methacrylic acid esters represented by the formula

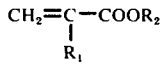

wherein $R_1$ is hydrogen or methyl, $R_2$ is alkyl with 1 to 8 carbon atoms, and $R_1$ is methyl when $R_2$ is ethyl.

7. The aqueous coating composition according to claim 1, in which said copolymer has an acid value of about 25 to 150 and a number average molecular weight of about 500 to 80,000.

8. The aqueous coating composition according to claim 7, in which said acid value and number average molecular weight are 45 to 130 and about 1,000 to 50,000 respectively.

9. The aqueous coating composition according to claim 1, in which said copolymer is composed of 7.5 to 95 wt.% of the monomer (A), 5 to 20 wt.% of the monomer (B) and 0.01 to 87.5 wt.% of the monomer (C).

10. The aqueous coating composition according to claim 9, in which the proportions of the monomers (A), (B) and (C) are about 25 to 80 wt.%, about 7.5 to 17.5 wt.% and 5 to 67.5 wt.%.

11. The aqueous coating composition according to claim 1, in which said copolymer and vinyl polymer are used in the ratio by weight of the copolymer to the emulsion (calculated as the total amount of solid) ranging from 99.7 : 0.3 to 0.3 : 99.7.

12. The aqueous coating composition according to claim 11, in which said range is from 90 : 10 to 10 : 90.

13. In an aqueous coating composition comprising a vinyl polymer emulsion prepared by subjecting at least one vinyl monomer selected from the group consisting of alkyl ($C_1$ to $C_{18}$) esters of acrylic or methacrylic acid, glycidyl acrylate, glycidyl methacrylate, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, hydroxypropyl methacrylate, diethylaminoethyl methacrylate, allyloxyethyl acrylate, allyloxyethyl methacrylate, styrene, α-methyl styrene, vinyl toluene, vinyl pyridine, butadiene, isoprene, chloroprene, acrylonitrile, methacrylonitrile, esterified product of glycidyl acrylate or methacrylate with saturated or unsaturated fatty acid having 1 to 26 carbon atoms and esterified product of glycidyl acrylate or methacrylate with alkyl ($C_1$ to $C_6$) substituted benzoic acid to emulsion polymerization in an aqueous medium in the presence of maleinized polybutadiene used as a dispersion stabilizer, an improvement which is characterized in that at least one copolymer is further incorporated, said copolymer being composed of (A) at least one monomer prepared by reacting one glycidyl ester of acrylic acid and methacrylic acid with at least one fatty acid of drying oil fatty acid and semi-drying oil fatty acid, (B) at least one α, β-ethylenically unsaturated acid selected from the group consisting of acrylic acid, methacrylic acid, crotonic acid, maleic acid, maleic anhydride and fumaric acid and (C) at least one unsaturated monomer selected from the group consisting of styrene, vinyltoluene and acrylic or methacrylic acid esters represented by the formula

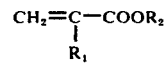

wherein $R_1$ is hydrogen or methyl, $R_2$ is alkyl with 1 to 8 carbon atoms, and $R_1$ is methyl when $R_2$ is ethyl, containing substantially no carboxyl group and having a Q value of at least 0.1 as determined by Q-e theory.

* * * * *